No. 885,897.

PATENTED APR. 28, 1908.

I. W. WEEKS.
FLAX HARVESTER.
APPLICATION FILED DEC. 30, 1907.

2 SHEETS—SHEET 1.

Witnesses

Inventor
Ira W. Weeks.

By
Attorneys

No. 885,897. PATENTED APR. 28, 1908.
I. W. WEEKS.
FLAX HARVESTER.
APPLICATION FILED DEC. 30, 1907.
2 SHEETS—SHEET 2.
Fig. 3.
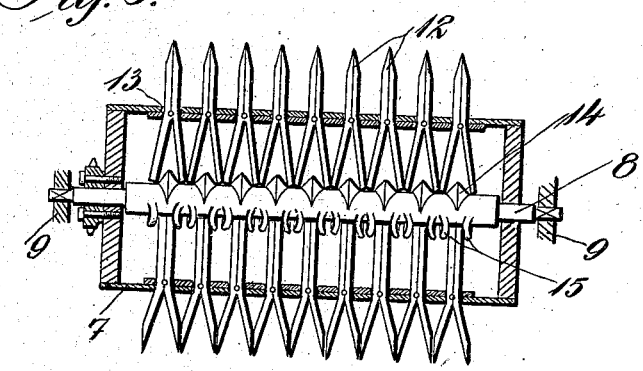
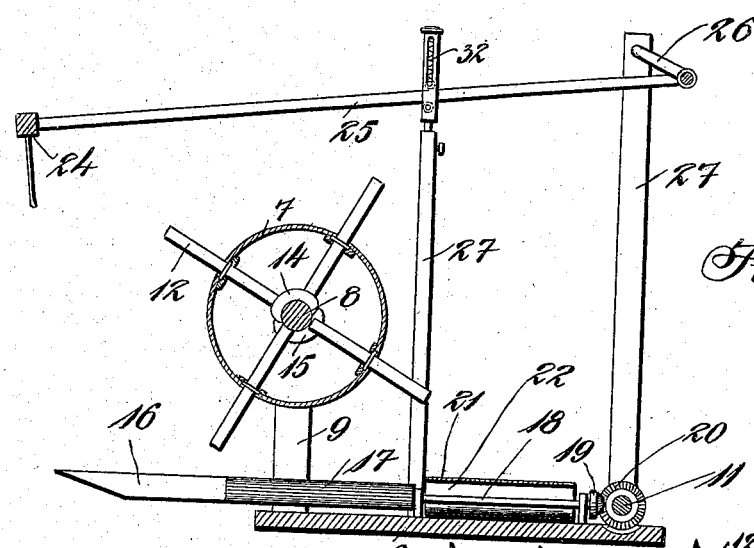
Fig. 4.
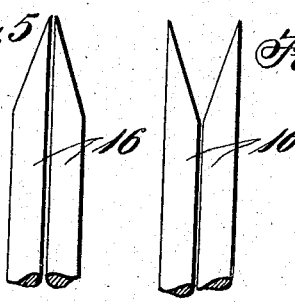
Fig. 5. Fig. 6. Fig. 7. Fig. 8.
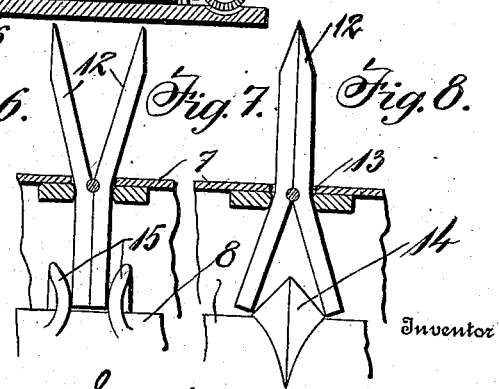
Witnesses
Inventor
Ira N. Weeks
By
Attorneys

UNITED STATES PATENT OFFICE.

IRA W. WEEKS, OF RICHMOND, MICHIGAN.

FLAX-HARVESTER.

No. 885,897. Specification of Letters Patent. Patented April 28, 1908.

Application filed December 30, 1907. Serial No. 408,494.

*To all whom it may concern:*

Be it known that I, IRA W. WEEKS, a citizen of the United States, residing at Richmond, in the county of Macomb and State of Michigan, have invented certain new and useful Improvements in Flax-Harvesters, of which the following is a specification.

This invention relates to flax harvesting or pulling machines, and has special reference to the means for pulling the flax from the ground.

The invention comprises a rotary cylinder provided with a series of sets of pincers which open and close to grip the flax plants and to pull the same. These pincers work in conjunction with pairs of horizontal rollers between which the flax plants enter, and these rollers serve to gather the plants so that the pincers will take hold thereof, and the rear ends of the rollers are also corrugated so that they will pull any flax which may be missed by the pincers.

The nature of the invention will more fully appear from the following description and the accompanying drawings.

Figure 1:
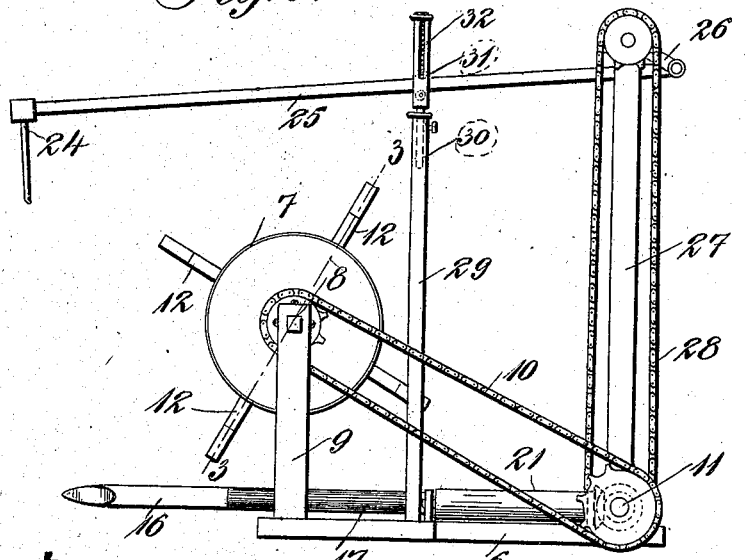
Figure 2:
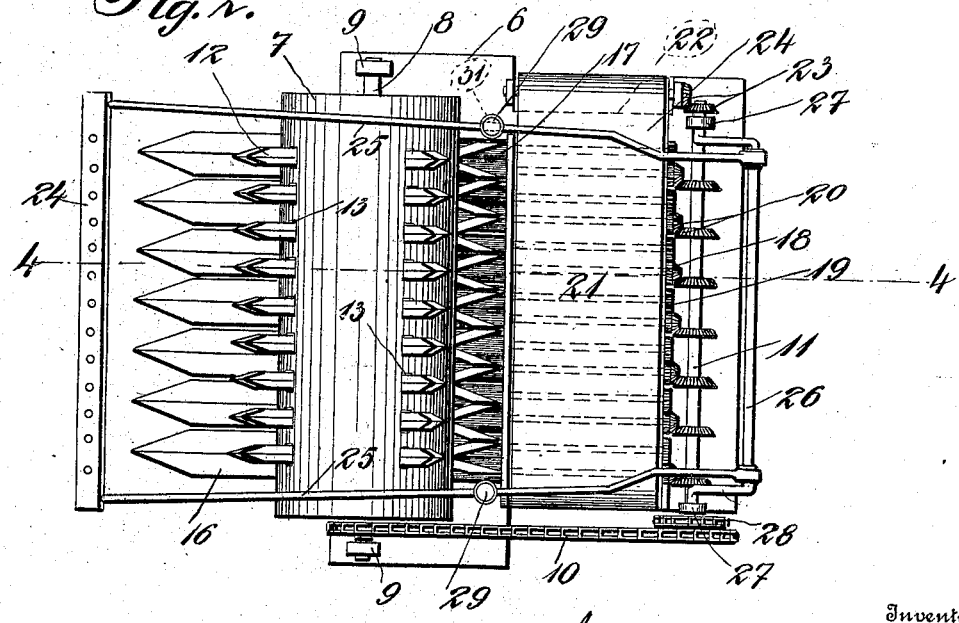

In the drawings, Figure 1 is a side elevation illustrating the devices invented by me. Fig. 2 is a top plan view. Fig. 3 is a section on the line 3—3 of Fig. 1. Fig. 4 is a section on the line 4—4 of Fig. 2. Figs. 5 and 6 are details of the front ends of the horizontal rollers. Figs. 7 and 8 are details illustrating the action of the pincers.

The devices forming the subject of this invention are mounted upon a suitable supporting platform 6 which is attached to and carried by the frame of any ordinary or suitable harvesting machine.

7 indicates a drum or cylinder conveniently made of sheet metal. This turns upon a fixed axle 8 supported by standards 9 on the platform, the cylinder being driven by a chain belt 10 from a main driving shaft 11 extending across the platform at the rear thereof. The said cylinder is hollow, and carries several rows of pincers 12. Four rows are shown, which will usually be found sufficient for the purpose indicated. The various pincers in each row are arranged in a line parallel to the axis, the jaws thereof projecting through openings 13 formed in the cylinder shell. The pincers open and close in a direction parallel to the axis of the cylinder. They are caused to open and close by means of cam projections on the shaft or axle
8. For each pair of pincers there is a single cam or projection 14 for the purpose of closing the same, and double cams or projections 15 for the purpose of opening the same. The pincers are not only arranged in axial rows, but the pincers of the respective rows are arranged in line circumferentially, so that one set of cams will operate on the respective pincers of all the rows. The closing cam 14 operates by entering between the inner ends of the pincer members, as shown in Fig. 7, and acts to spread said members, and consequently to close the outer ends or jaws, and this cam is of such length that it will hold the jaws closed from a point just beyond the beginning of the upward turn to a point beyond the beginning of the downward turn, as the cylinder rotates in the direction shown by the arrow. The opening cams are shaped or inclined to bear against the outer sides of the inner ends of the jaw members of the pincers and to force said inner ends together as shown in Fig. 8, said cams coming into operation as soon as the pincers leave the closing cam 14. As shown, the direction of rotation of the cylinder is such that the pincers close as they ride up the front side thereof and open after passing the top center.

The cylinder is so supported that the pincers, when in their lowest position, pass a short distance above pairs of horizontal rollers 16 which are supported in suitable bearings on the platform and which are located parallel to the line of travel of the machine. The front ends of these rollers project in advance of the cylinder, and the ends of the roller forming each pair are oppositely beveled as shown in Figs. 5 and 6. When the rollers are rotated, by means to be hereinafter described, the flax plants are drawn or gathered between the same, entering the V-shaped space, as shown in Fig. 5, between the ends thereof, as the machine travels, and by the action of the rollers, as they rotate, the plants are forced together into a narrow row which arranges the plants so that they are easily gripped by the pincers and also assists the pulling action, which takes place just after the plants pass within or between the beveled ends of the rollers. The rear part of the rollers is corrugated, as indicated at 17, and these corrugations act to grip and pull any plants which may escape the pincers. The rollers have rearwardly extending shafts 18 which are geared together in pairs by spur gears 19 and which are driven by beveled gearing 20 from the main cross shaft 11 heretofore referred to.

At the rear of the corrugated portion of the rollers, and below and behind the cylinder 7, is a laterally traveling belt or apron 21 which extends around rollers 22 driven by suitable beveled gearing 23 from the shaft 11. This apron travels toward the side, so as to deliver the flax onto the ground at the side of the platform. The operating devices for the pincers are so arranged that they release the plants at the proper time to drop from the pincers onto the apron 21, to which also the plants from the roller 17 pass after being pulled.

In order to draw the flax plants toward the drum at the front of the machine, I provide a rake 24 which is carried at the front ends of rods 25 which are connected at their rear ends to a crank 26 which is supported by standards 27 on the platform and is driven by a chain belt 28 from the shaft 11. The rods 25 are supported by standards 29 which are mounted on the platform, and these standards are formed in adjustable sections as indicated at 30 so that they may be raised or lowered to vary the position of the rake. The rods 25 work through slots 31 in the upper part of the standards, the slots being used to allow for the vibration incident to the turn of the crank. Springs 32 are located in the standards above the rods and bear on the latter to hold them in proper position, allowing, however, a certain amount of yielding action to permit the rake to lift, if necessary; for instance if it should strike an obstacle in front of the machine.

The motion imparted by the crank causes the rake to describe an elliptical course, reaching out ahead of the machine and then being drawn back in a lower arc toward the pulling devices and raking or combing the flax plants toward the same in proper position to be engaged thereby.

I claim:

1. The combination of a shaft, a cylinder rotatable thereon and having openings in its sides, rows of pincers carried by the cylinder and extending through said openings and adapted to open and close to grip and lift plants, and cams on the shaft, engageable by the inner ends of the pincers to open and close the latter.

2. The combination of a shaft, a carrier rotatable thereon, gripping devices mounted in rows on said carrier and arranged to open and close in a plane parallel to the axis of the carrier, the devices having inner ends in proximity to the shaft, and means located on the shaft to open and close said gripping devices.

3. The combination of a set of rollers arranged in pairs and extending lengthwise and pointed at the front ends to admit plants therebetween, and a rotary carrier located above said rollers, and gripping devices mounted on said carrier and having operating means, to grip and pull said plants.

4. In a plant pulling machine, the combination of a pair of pulling rollers extending parallel to the line of travel of the machine and in substantially horizontal position, said rollers being beveled at the front end, the bevels being opposite on the respective rollers, and on one side only thereof.

5. The combination of a set of pairs of horizontal pulling rollers extending lengthwise, a rotary carrier located over the rollers and extending crosswise and having gripping and pulling devices mounted thereon, and an endless belt conveyer located behind the rollers and the carrier and traveling laterally and arranged to receive material from both and to deliver the same at one side.

6. In a harvester, the combination with plant pulling devices, of a rake located in advance thereof, a bar carrying the rake at its front end, a support for the bar between its ends, and on which the bar is movable back and forth, a crank connected to the rear end of the bar, and means to turn the crank.

7. In a harvester, the combination with plant pulling devices, of a standard having a slot at the top, a bar extending through said slot and movable back and forth and up and down therein, a spring between the standard and bar, to yieldingly hold the bar down, a rake on the front end of the bar, a crank connected to the rear end of the bar, and means to turn the crank.

In testimony whereof I affix my signature, in presence of two witnesses.

IRA W. WEEKS.

Witnesses:
 SOPHIE C. GATZKE,
 CORA E. HEMPEL.